United States Patent Office 3,087,894
Patented Apr. 30, 1963

3,087,894
OIL COMPOSITION HAVING LOW POUR POINT
Edgar L. McKegney and Stephan Ilnyckyj, Sarnia, Ontario, Canada, assignors to Esso Research and Engineering Company, a corporation of Delaware
No Drawing. Filed Sept. 2, 1959, Ser. No. 837,568
4 Claims. (Cl. 252—56)

The present invention is concerned with an improved hydrocarbon composition having a low pour point. The oil composition of the present invention, in essence, comprises a virgin gas oil and a low cold test oil to which has been added a minor amount of a copolymer of ethylene and vinyl acetate. The composition of the present invention is particularly desirable for use as a, "fogging oil," in the transportation of gases as, for example, natural gas and other gases.

It is well known in the art to use various mixtures and additives in order to lower the pour point of the oils. For example, a wide variety of compounds has been found to be effective as pour point depressants for lubricating oils. Among the best known are "Paraflow," "Santopour" and "Acryloid" and their modifications. They are prepared either by condensing aromatic compounds with long chain paraffins, such as wax, or by condensing olefinic esters. It is generally considered that these pour depressants are effective in that in cooling an additive-containing oil, the hydrocarbon chain of the additive becomes incorporated into the crystal lattice of the separated wax, while the other part of the pour depressant molecule prevents the crystals from adhering together to form a gel structure. The failure of these additives to be effective in middle distillates may at least in part be due to the basic difference in the composition between the wax in lubricating oils and that in middle distillate fuels.

It is one object of the present invention to provide an improved hydrocarbon oil composition comprising a virgin gas oil and a low cold test oil which is particularly desirable for use as a "fogging oil." These "fogging oils" are used in the transportation of gases such as natural gas through pipelines and the like. In many instances, it is desirable to provide a suitable lubricant in these pipelines so that the valves and other movable equipment may be readily adjusted. Also these "fogging oils" serve to prevent corrosion and thus lengthen the effective life of the pipeline and auxiliary equipment. In this use the amount of oil added varies appreciably, but is generally in the range from about 0.1 to 5 gallons of "fogging oil" per ten million cubic feet of gas transported. In this operation, it is very desirable that the oil have a high degree of flowability, particularly, in cold areas. As a matter of record, it is desirable that the pour point of the "fogging oil" be below about 10° F., ASTM pour point, preferably below about 5° F. pour. The additive used in conjunction with the virgin gas oil and low cold test oil of the present invention comprises a copolymer of ethylene and up to about 50% by weight of an olefinically unsaturated aliphatic monomer containing from about 3 to 5 carbon atoms per molecule. In general, these compounds may comprise vinyl acetate, vinyl propionate, methyl methacrylate, allyl ethyl ether, divinyl ether, acrylonitrile, vinylacetonitrile and the like.

The preferred copolymers comprise ethylene-vinyl acetate copolymer. It is preferred that the parts by weight of ethylene in the copolymer be in the range from about 60 to 99% as compared to parts by weight of vinyl acetate in the range from about 40 to about 1%. A very desirable ethylene-vinyl acetate copolymer contains about 15 to 25% by weight of vinyl acetate, as for example, about 20% parts by weight of vinyl acetate.

The molecular weights of the ethylene-vinyl acetate copolymer are critical and should be in the range from about 1,000 to 3,000, preferably, in the range from about 1,500 to 2,200. The molecular weights are determined by K. Rast's method (Ber. 55, 1051, 3727 (1922)).

The ethylene-vinyl acetate copolymer as described above is used in a concentration in the range from about .001 to .5% by weight, preferably, in a concentration in the range from about .005 to .1% by weight.

Surprisingly, these low molecular weight copolymers have no effect upon the pour points of lubricating oils, thus emphasizing the difference in structure between the wax associated on the one hand with lube oils and on the other with middle distillates. The low molecular weight copolymers may be prepared by any peroxide process. In some instances, it may be desirable to first prepare a higher average molecular weight polymerization product and then recover from that product material having a molecular weight within the range between about 1,000 and about 3,000. Since such polymerization products normally consist of a smear of polymers whose molecular weights vary over a wide range, an effective method for recovering the 1,000 to 3,000 molecular weight portion therefrom is to extract the product with a solvent such as normal heptane or methyl-ethyl ketone. Other methods for obtaining the low molecular weight materials include thermal degradation of the high molecular weight polymer or treatment of the high molecular weight polymer with ozone in order to break the polymer chains. Still other methods also useful will be apparent to those skilled in the art.

A very desirable method is to conduct polymerization in a benzene solution using di-tertiary-butyl-peroxide as an initiator at a temperature in the range from about 280° to 340° F. The preferred temperature is about 300° F. The pressure is in the range from about 700 to 2,000 pounds, preferably, at about 800 pounds. The autoclave or similar equipment containing the solvent, initiator and vinyl acetate is purged about three times with nitrogen, twice with ethylene and then charged with a sufficient amount of ethylene to yield the desired pressure when heated to the reaction temperature. During the polymerization, additional ethylene is added whenever the pressure drops by about 100 p.s.i.g. Polymerization is considered complete when it is less than 50 p.s.i.g. pressure drop per hour. The product is stripped free of solvent and unreacted vinyl acetate under vacuum.

The virgin gas oil fraction of the present invention comprises a gas oil usually secured from a non-naphthenic type crude, whereas, the low cold test oil is a pipe still cut from a naphthenic type crude. These naphthenic type crudes are characterized by being inherently free of relatively long chain waxy constituents. Typical inspections of a low cold test oil and a virgin gas oil are shown in the following Table I:

TABLE I

*Some Properties of Virginia Gas Oil and Low Cold Test*

|  | V.G.O.[1] | 58/60 L.C.T.[2] |
|---|---|---|
| Viscosity at 100° F., SUS | 46.98 | 58.09 |
| ASTM Distillation, ° F.: |  |  |
| 1 | 487 | 570 |
| 5 | 523 | 590 |
| 10 | 544 | 595 |
| 20 | 564 | 603 |
| 30 | 580 | 610 |
| 40 | 593 | 616 |
| 50 | 606 | 622 |
| 60 | 620 | 629 |
| 70 | 633 | 636 |
| 80 | 643 | 646 |
| 90 | 668 | 660 |
| 95 | 682 | 672 |
| FBP | 702 | 693 |
| ASTM Pour Point, ° F.: |  |  |
| as is | +40 | −45 |
| +0.05% Copolymer[3] | +15 | −60 |
| +0.1% Copolymer[3] | +10 | −60 |
| +0.2% Copolymer[3] | +5 | −60 |

[1] Virgin gas, oil.
[2] Low cold test oil.
[3] Copolymer of ethylene and vinyl acetate. Molecular weight about 800. About 8% vinyl acetate in copolymer.

From the above, it is apparent that the copolymer of the present invention did not greatly affect the pour point of the low cold test oil and had no very great effect on the pour point of the virgin gas oil even when used in concentration of 0.2% by weight.

Various quantities of the virgin gas oil and low cold test oil were used in conjunction with .05% of the copolymer. The results of these tests are shown in the following Table II.

TABLE II

| Volume Percent | | ASTM Pour | |
|---|---|---|---|
| Virgin Gas Oil[1] | Low Cold Test[2] | No. Add. | Plus .05 Add. |
| 100 | 0 | 40 | 15 |
| 80 | 20 | 35 | 5 |
| 60 | 40 | 35 | −10 |
| 50 | 50 | 25 | −20 |
| 40 | 60 | 25 | −25 |
| 20 | 80 | 5 | −45 |
| 0 | 100 | −45 | −60 |

[1] Boiling range 487° to 702° F. from non-napthenic type crude.
[2] Boiling range 570° to 693° F. from a naphthenic type crude.

It is apparent that without the addition of the copolymer, it would be necessary to utilize about 80% of the low cold test oil as compared with 20% of the virgin gas oil if the pour point is to be below about 10. On the other hand, when using 0.05% of the copolymer, it is only necessary to use approximately 20% of the low cold test oil, which is very desirable.

In other tests other pour depressants were used to determine the effect on mixtures of virgin gas oil and low cold test oil. The results of these tests are shown in the following Table III.

TABLE III

*Effect of Paraflow on ASTM Pour Point of Virgin Gas Oil (487°–702° F.) and Its Blend With 58/60 Low Cold Test Oil*

|  |  | ASTM Pour Point, ° F. | |
|---|---|---|---|
| Paraflow, wt. percent |  | nil | 0.4 |
| Oil Composition | | | |
| V.G.O. percent[1] | 58/60 L.C.T.[2] | | |
| 100 | 0 | +40 | +40 |
| 50 | 50 | +25 | +10 |

[1] Virgin gas oil, boiling range 487°–702° F.
[2] 58/60 Low cold test oil, boiling range 570°–693° F.

From the above, it is apparent that when using 0.4% of paraflow with a 50–50 mixture, the pour point was +10. When this is compared with the data presented in Table II with a 50–50 volume percent mixture, the pour point attained was −20 when utilizing only 0.05% of the copolymer of the present invention.

What is claimed is:

1. An improved low cold test lubricating composition for addition to natural gas being transported in pipelines which consists essentially from about 80 to 20% by volume of a virgin gas oil fraction secured from a non-naphthenic type crude and boiling in the range from about 487° F. to about 702° F. and from about 20 to 80% by volume of a low cold test oil secured from a naphthenic type crude and boiling in the range from about 570° F. to about 693° F. in combination with from about .001 to 0.5 wt. percent based upon total oil present of a copolymer of ethylene and vinyl acetate, said copolymer having a molecular weight between about 800 and 3,000 and containing from about 1 to 40% by weight of vinyl acetate.

2. The lubricating composition of claim 1 wherein said virgin gas oil boils in the range from about 350° to about 750° F., and wherein said low cold test oil is a naphthenic type oil boiling in the range from about 375° to 750° F.

3. The lubricating composition of claim 1 wherein said copolymer has a molecular weight between about 1,500 and 2,200.

4. The lubricating composition of claim 1 wherein the amount of virgin gas oil present is about 80% and wherein the amount of low cold test fraction present is about 20%.

References Cited in the file of this patent

UNITED STATES PATENTS 2,824,124    Robertson et al. _____ Feb. 18, 1958

FOREIGN PATENTS 638,355    Great Britain _____ June 7, 1950
787,055    Great Britain _____ Nov. 27, 1957